UNITED STATES PATENT OFFICE.

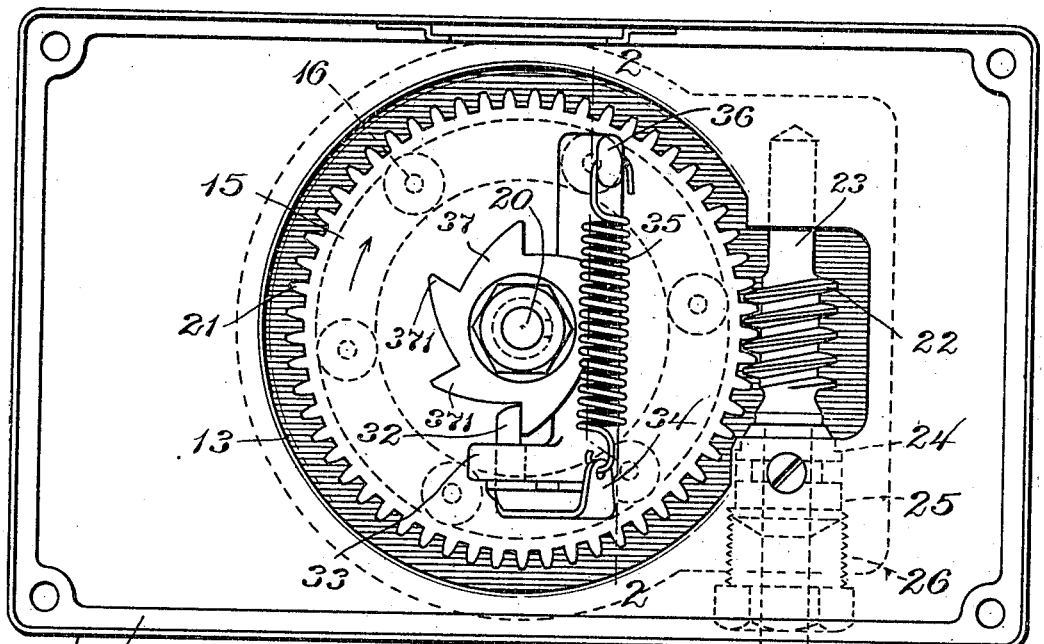

CHARLES C. DODGE, OF NEWARK, NEW JERSEY, ASSIGNOR TO THE DODGE LUBRICATOR COMPANY, OF BOSTON, MASSACHUSETTS, A CORPORATION OF MASSACHUSETTS.

LUBRICATOR.

No. 812,330.        Specification of Letters Patent.        Patented Feb. 13, 1906.

Application filed October 16, 1905. Serial No. 282,881.

*To all whom it may concern:*

Be it known that I, CHARLES C. DODGE, of Newark, in the county of Essex and State of New Jersey, have invented certain new and useful Improvements in Lubricators, of which the following is a specification.

This invention has relation to force-feed lubricators of the type of the one illustrated in my copending application, Serial No. 234,736, filed November 29, 1904, and has for its object to provide certain improvements therein, in consequence of which the construction may be simplified, the labor of production reduced, and the efficiency of operation enhanced.

To these ends the invention consists of certain novel features of construction and arrangement of parts, as illustrated by the accompanying drawings, described in the following specification, and particularized in the claims.

On the drawings, Figure 1 represents in plan view with the cover removed a convenient form of lubricator embodying my invention. Fig. 2 represents a section on the line 2 2 of Fig. 1. Fig. 3 represents a section through the carrier on the same line and shows the plunger near the end of its inward stroke. Fig. 4 represents the carrier and the parts thereon. Fig. 5 is a fragmentary view of the bottom of the tank or reservoir.

Referring to the drawings, 10 indicates a reservoir for lubricant which may be of any desired form or material. Preferably it is formed with any suitable cover (not shown) and with a base 11, to which the cover may be attached by long bolts or screws 12. The sides of the reservoir may be formed of any suitable material, and the reservoir itself may be either round or rectangular in plan view. The base 11 is provided with a depressed or cup-like portion 13, which is adapted to receive the operating mechanism. The bottom 14 of the cup 13 forms a seat for a carrier 15 and is provided with a series of outlet-ducts 16, arranged in substantially a circle. Connected to the ducts 16 are conduits 17, secured to the under side of the cup by packing-screws 18. Through these ducts and conduits the lubricant is delivered to the various bearings or working surfaces which are to be lubricated.

Surrounding the inner mouth of each of the ducts 16 there is an annular boss 19, the upper surfaces of said bosses being all in the same plane, so that the carrier 15 rests against them so as to normally close the ducts 16 except at predetermined times, as hereinafter described. Arranged in the center of the circle formed by the ducts 16 is a fixed upright pin or arbor 20, which is secured to the bottom of the cup-like portion 13 of the base and upon which the carrier 15 is journaled. This carrier is provided on its periphery with worm-teeth 21, so that it may be rotated by a worm 22, formed upon a shaft 23, arranged tangentially to the carrier. The worm itself is located in a depression or recess formed in the base 11, as shown in Fig. 1. The shaft 23 is passed through an aperture in the side or bottom portion of the base and is held in place by a shouldered sleeve 24, into a peripheral groove of which a screw 25 is passed downwardly through the base. A suitably-threaded sleeve 26 with packing is utilized to prevent leakage of the lubricant past the bearings of the shaft 23. On the end of the shaft is placed a belt-wheel 27, which may be connected thereto in any suitable or convenient way to transmit power from some roving element.

The carrier 15, which is substantially in the form of a disk, is cast on its upper surface with a raised portion 28, which is bored out to constitute a horizontal pump-cylinder 29, the end of which communicates with a discharge-duct 30 at right angles thereto. Said discharge-duct is adapted to register successively with the outlet-ducts 16. The bottom of the carrier is smooth, and, as has been said, the upper surfaces of the bosses 19 are smooth, so that the carrier fits closely against its seat thus formed by the bosses 19 and prevents the escape of lubricant.

In the pump-cylinder there is a piston or plunger 31, the outer end of which is bent back upon itself to form a parallel portion or operating-stem 32, which passes through a guiding ear or lug 33, formed on the top of the carrier. A clip 34 is attached to the bent end of the piston, and it is connected by a tension-spring 35 with a lug 36 on the carrier 15. This spring tends to maintain the piston at the inner end of its movement, as shown in Fig. 2. The clip itself consists of a T-shaped piece of metal with apertures in the ends of the head, through which the piston 31 and the stem 32 are passed, after which the clip is bent into the form shown in Figs. 3 and 4. Above the carrier is arranged a cam-disk 37, which is keyed upon the arbor 20, so as to be held against rotation. On the threaded end of the arbor is a nut 38 and washer 39, between which and the cam there is a compression-spring 40. This spring bearing against the cam 37 and the carrier 15 holds the latter upon its seat. The cam-disk 37 is provided with a plurality of projections or cam-rises 371, which are equal in number to the outlet-ducts 16. The operating-stem 32 of the piston 31 is so located radially of the carrier as to have its end bear against the cam, in consequence of which when the carrier is rotated in the direction of the arrow in Fig. 1 the piston will be moved outward against the tension of the spring until it rides off of the end of the cam projection, immediately upon which the spring will advance the piston so as to force out the lubricant contained in the cylinder. During the time that the disk is rotating to carry the channel or duct 30 from one of the outlet-ducts 16 to the next succeeding duct 16 the piston will be forced outwardly or retracted, as described, the end of the duct 30 being open as it passes from one of the bosses 19 to the next succeeding boss, so that the lubricant will be drawn into the pump-cylinder by the outward movement of the piston. The projections 371 are preferably so formed that during the travel of the rod 32 over them the pump-piston will not be appreciably moved during the time that the mouth of the duct is traveling across the face of one of the bosses 19.

It will be observed that all of the operating parts of the mechanism are mounted and located upon the base 11. The parts are all compact and simple in construction. For instance, as stated, the piston 31 and its operating-stem 32 are formed of one cylindrical piece of metal, which may be bent in proper form. The bottom face of the carrier is flat, and it is unnecessary to grind the opposing faces of the carrier and its seat, a simple turning operation enabling them to be fitted with sufficient accuracy. By mounting the controlling-cam and the carrier directly on the arbor I provide a more compact arrangement than where the controlling-cam is formed of an annular ring.

Having thus explained the nature of the invention and described a way of constructing and using the same, although without attempting to set forth all of the forms in which it may be made or all of the modes of its use, I declare that what I claim is—

1. In a lubricator such as described, the combination with a reservoir for the lubricant having a plurality of discharge-ducts, of a rotary pump-carrier and pump located in the reservoir and having a duct adapted to register successively with the first-mentioned ducts, an arbor on which the said pump-carrier is supported, and a fixed cam on said arbor having projections for operating the pump, and means for rotating the carrier.

2. In a lubricator such as described, the combination with a reservoir for the lubricant having a plurality of discharge-ducts whose mouths are in the same plane, of a carrier having a flat under face and having a duct adapted to register successively with the discharge-ducts, a pump extending across the said carrier, means for rotating the carrier, and means for operating the pump.

3. In a lubricator such as described, the combination with a reservoir having a plurality of annular bosses, with discharge openings or ducts, said bosses all having their faces in the same plane, of a rotary pump-carrier located in the reservoir and having a flat bottom face seated upon said bosses, said carrier having a pump and a duct from said pump adapted to register successively with the said openings, and means for rotating the carrier and operating the pump.

4. In a lubricator, such as described, a reservoir having a base with a cup-shaped depression, said depression having in its bottom a series of bosses with outlet-ducts therethrough, a rotary pump-carrier arranged in the cup-shaped depression and seated upon said bosses and having a pump discharge-duct adapted to register successively with the outlet-ducts, a pump on said carrier, and means for rotating the carrier and operating said pump.

5. In a lubricator such as described, a reservoir having a base provided with a series of outlet-ducts, a fixed arbor secured to said base, a pump-carrier mounted to turn on said arbor and having a pump discharge-duct adapted to register successively with said outlet-ducts, a cam fixed against rotation on said arbor and having cam-teeth, a pump on said carrier whose plunger is adapted to be controlled by said cam-teeth, and means for rotating said carrier.

6. In a lubricator, such as described, a reservoir having its base provided with a series of outlet-ducts, an arbor, a pump-carrier rotatable on said arbor and seated against the mouths of said outlet-ducts, said carrier having a pump discharge-duct adapted to register successively with said outlet-ducts, a pump on said carrier comprising a cylinder and a piston, an operating-stem connected to said piston, a spring for moving the piston in one direction, a cam supported by said arbor and held thereby against rotation for moving the piston in the opposite direction, and means for rotating said pump-carrier.

7. In a lubricator, such as described, the combination with a reservoir-base having outlet-ducts, of a fixed upright arbor, a pump-carrier rotatable on said arbor and seated against said outlet-ducts, said carrier having a pump and a pump discharge-duct adapted to register successively with said outlet-ducts, a non-rotary cam mounted on said arbor above said pump-carrier and having teeth on its periphery for operating said pump, an adjustable abutment on said arbor, and a spring interposed between said abutment and said cam for yieldingly forcing said carrier against its seat.

8. In a lubricator, such as described, the combination of a reservoir-base, an upright arbor fixed to said base, a rotary carrier journaled on said arbor, a horizontal pump on said carrier to one side of said arbor, an operating-stem connected to the pump-plunger and arranged radially of the carrier, and a disk on said arbor having cam-teeth on its periphery to be engaged by said operating-stem, substantially as described.

9. In a lubricator such as described, the combination of a reservoir-base, an upright arbor fixed to said base, a rotary carrier journaled on said arbor, a horizontal pump on said carrier on one side of said arbor, a horizontal operating-stem for the pump-plunger, and fixed projections with which said stem coöperates to control the plunger.

In testimony whereof I have affixed my signature in presence of two witnesses.

CHARLES C. DODGE.

Witnesses:
   M. B. MAY,
   C. C. STECHER.